United States Patent [19]
Cook

[11] Patent Number: 5,830,380
[45] Date of Patent: Nov. 3, 1998

[54] METHYL SALICYLATE ANTIFREEZE SOLUTION METHOD

[75] Inventor: W. Keith Cook, Greensboro, N.C.

[73] Assignee: Camco Manufacturing, Inc., Greensboro, N.C.

[21] Appl. No.: 896,913

[22] Filed: Jul. 18, 1997

[51] Int. Cl.⁶ .................................................. C09K 5/00
[52] U.S. Cl. ........................... 252/79; 137/301; 252/76
[58] Field of Search ..................... 252/76, 79, 71, 252/73; 137/301; 73/23.34; 428/905

[56] References Cited

U.S. PATENT DOCUMENTS

| | | | |
|---|---|---|---|
| 3,240,708 | 3/1966 | Dulat et al. | 252/79 |
| 3,929,154 | 12/1975 | Goodwin | 137/344 |
| 4,304,688 | 12/1981 | Mori | 252/522 R |
| 4,531,538 | 7/1985 | Sandt et al. | 137/334 |
| 4,587,027 | 5/1986 | Preusch et al. | 252/73 |
| 4,861,514 | 8/1989 | Hutchings | 252/187.21 |
| 5,085,793 | 2/1992 | Burns et al. | 252/79 |
| 5,676,182 | 10/1997 | McMullen, Jr. et al. | 141/66 |

FOREIGN PATENT DOCUMENTS

| | | |
|---|---|---|
| 60-242855 | 12/1985 | Japan . |
| 61-252247 | 11/1986 | Japan . |
| 6-234678 | 8/1994 | Japan . |
| 8-291050 | 11/1996 | Japan . |
| 96/16633 | 6/1996 | WIPO . |

OTHER PUBLICATIONS

Quantum Chemical Company, Material Safety Data Sheet for Product 13601027, 30 Apr. 1996.

Camco Manufacturing Inc., Material Safety Data Sheet for Arctic Ban, 15 May 1992.

Camco Manufacturing, Inc., Material Safety Data Sheet for Easy Going RV Antifreeze, 29 Apr. 1997.

Camco Manufacturing, Inc., Manufacturing Safety Data Sheet for Freeze Ban, 29 Apr. 1997.

*Primary Examiner*—Christine Skane

[57] ABSTRACT

An antifreeze solution for use in potable water systems is provided which has a distinct, pleasant aroma. The aroma allows the user to determine by smell the presence of the antifreeze solution in the water system. The antifreeze solution contains methyl salicylate, ethyl alcohol and propylene glycol and water in specific proportions to insure against freezing.

5 Claims, 2 Drawing Sheets

METHYL SALICYLATE ANTIFREEZE SOLUTION METHOD

BACKGROUND OF THE INVENTION

1. Field of the Invention

The invention herein pertains to winterizing potable water systems and particularly pertains to an antifreeze solution and method for a potable water system of a recreational vehicle (RV).

2. Description of the Prior Art and Objectives of the Invention

Sales of recreational vehicles have increased in recent years and many owners perform routine winterizing tasks to insure that their RV will be properly protected against freezing temperatures. Specifically, the potable water systems therein must be protected from freezing temperatures and antifreeze solutions have been offered in the past containing propylene glycol because of its inherent low-toxicity and because it is odorless and tasteless. Certain other prior art antifreeze mixtures for potable water systems have utilized propylene glycol and ethanol mixtures. A colorant is generally included in the antifreeze solution which in turn allows the user to determine by sight if the antifreeze is present in the potable water system.

In addition, flavored alcohol/water mixtures have been sold in the past as antiseptics, such as used in personal hygiene and mouthwash solutions. Such personal hygiene products utilize ethyl alcohol/methyl salicylate compounds in order to provide a pleasant odor and taste. In addition, conventional alcohol and propylene glycol antifreeze solutions for potable water systems often have an objectionable odor due to impurities which often accompany recycled propylene glycol. Further, conventional antifreeze solutions for potable water systems are often degraded by UV light, in that the color which may be red when initially packaged, after storage in a relatively short period of time in ultraviolet light, tends to fade and may turn pink or become colorless. This is of particular inconvenience to consumers that use the color as an indicator as to whether the antifreeze solution has completely permeated the water lines for freeze protection.

Thus, with the disadvantages and problems associated with prior art antifreeze solutions and methods, the present invention was conceived and one of its objectives is to provide an antifreeze solution for use in potable water systems which has a pleasant, agreeable aroma.

It is also an objective of the present invention to provide an antifreeze solution which can be easily detected in the water system by its pleasant odor.

It is still a further objective of the present invention to provide an antifreeze solution which includes methyl salicylate as its odor producing source.

It is still another objective of the present invention to provide a method of utilizing an antifreeze solution which includes determining whether the potable water system is properly winterized by odor detection.

Various other objectives and advantages of the present invention will become apparent to those skilled in the art as a more detailed description is set forth below.

SUMMARY OF THE INVENTION

The invention herein pertains to antifreeze solutions for potable water systems such as water systems as are conventionally used in recreational vehicles and otherwise. The antifreeze solution employed contains methyl salicylate dissolved in an ethyl alcohol/water solution which is then mixed with propylene glycol and water. A pleasant minty fragrance is provided by the methyl salicylate which allows the user to easily detect by smell, the presence of the antifreeze in the water system.

In use, the potable water system is drained and a freeze preventing amount of antifreeze solution is pumped or otherwise delivered through the water lines, such as by opening the sink faucet. With the faucet open, the user can detect the fragrant, characteristic odor of the methyl salicylate. Thereafter, the faucet can be closed and the user assured that the water line is properly winterized. Other faucets and/or facilities can likewise be winterized and tested by smelling for the methyl salicylate. When the RV is to be put back into standard use, the antifreeze is drained from the water lines, fresh water pumped through the lines for rinsing purposes and the potable water system is again ready.

DETAILED DESCRIPTION OF THE PREFERRED EMBODIMENTS AND OPERATION OF THE INVENTION

Figure 1:
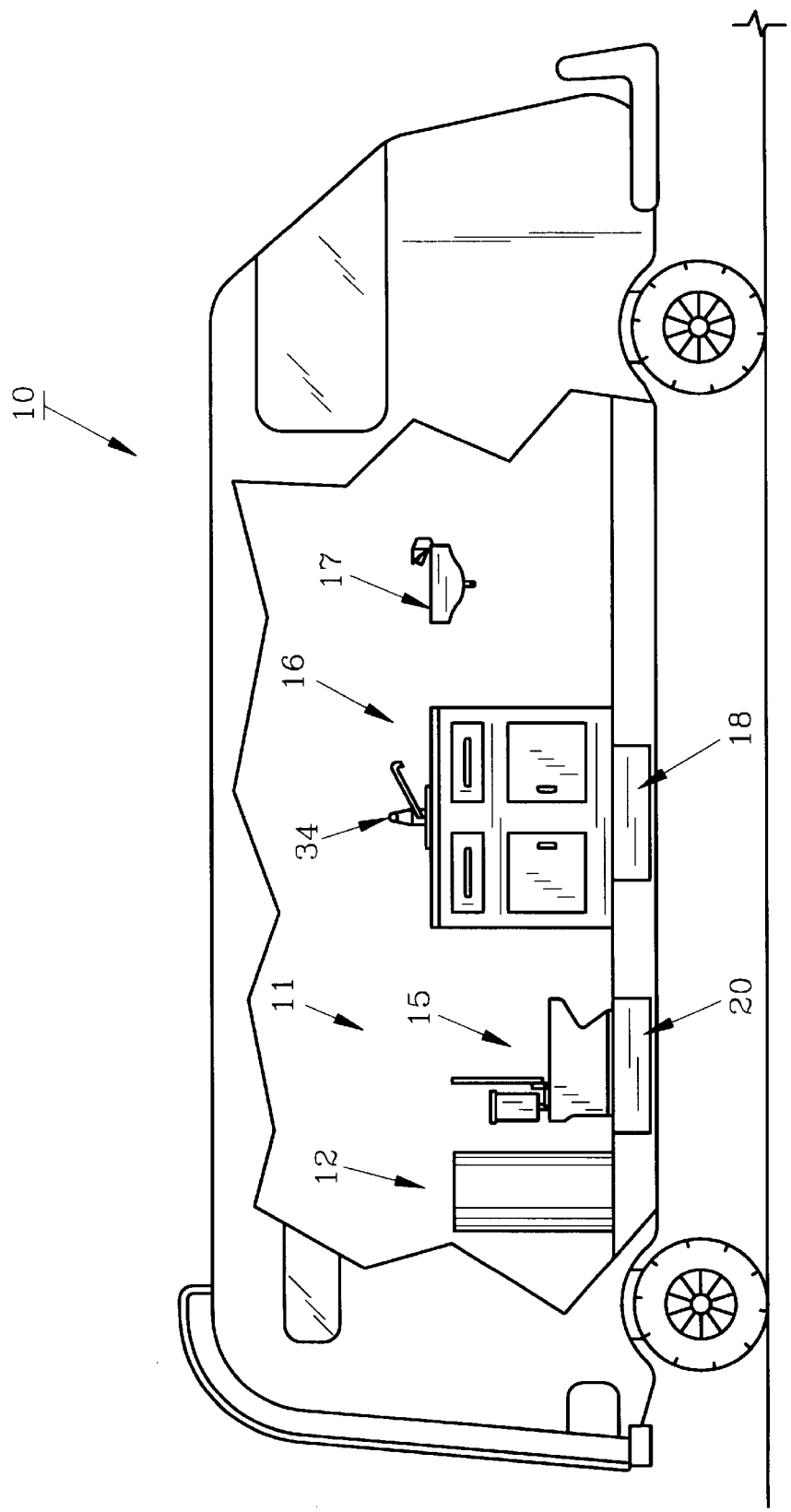
FIG. 1 illustrates a cut-away view of a conventional RV to expose certain plumbing fixtures therein.

For a better understanding of the invention and its method of use, turning now to the drawings, FIG. 1 shows a conventional recreational vehicle (RV) 10 having a potable water system generally indicated at 11, (shown in more detail in FIG. 2) which includes a potable water storage tank 12, pump 13, hot water tank 14, commode 15, lavatory 16, and drinking fountain 17. As would be understood other plumbing fixtures in a typical RV may include a kitchen sink, ice maker, and other potable water facilities (not shown herein). Gray waste water tank 18 includes drain valve 19 and black waste water tank 20 which is connected to commode 15 provides drain valve 21. Hot water heater bypass line 22 includes valve 23 which can be opened when valves 24, 25 are closed to allow fresh water to bypass water heater 14 such as during winterizing of water system 11. In addition valve 26 can be closed to thereby allow liquid antifreeze solution 35 contained within one (1) gallon jug 30 to be pumped through potable water system 11 by closing valve 26 and opening valve 27.

The preferred method of winterizing potable water system 11 is undertaken to provide freezing protection such as when RV 10 as shown in FIG. 1 is in non-use such as during cold winter months when the temperature drops below freezing. The method utilizes preferred antifreeze solution 35 as contained within gallon jug 30 consisting of an odorous antifreeze solution comprising by volume:

15% ethyl alcohol/methyl salicylate solution,

14% propylene glycol; and

71% water, wherein said ethyl alcohol/methyl salicylate solution contains by weight:

91% ethyl alcohol;

7.5% water; and 1.5% methyl salicylate.

Methyl salicylate contributes a pleasant, minty fragrance to antifreeze solution 35 and allows the antifreeze solution 35 to be sensory acknowledged. Specifically, antifreeze solution 35 can be readily smelled and identified even with other odors which may be typically present in the interior RV environment. For example, the odor of antifreeze solution 35 can be easily distinguished even in a mold and mildew laden environment, such as may occur in a bathroom in RV 10.

Figure 2:
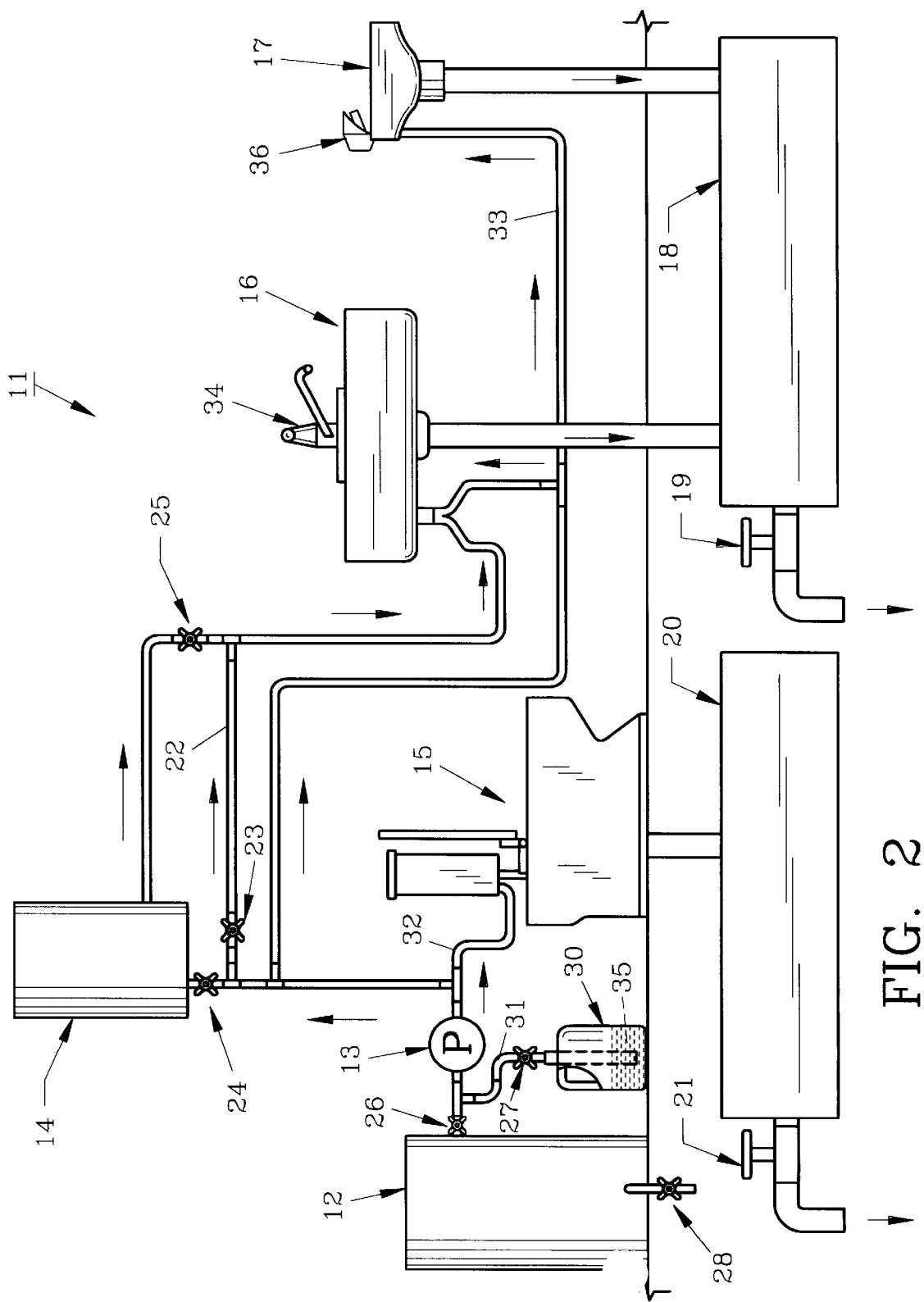
FIG. 2 shows a schematic diagram of the potable water system as shown in FIG. 1.

The preferred method of winterizing RV 10 as shown in FIG. 1 includes:

1) Draining potable water system 11 such as by closing valve 26 and opening valve 28 to allow fresh water tank 12 to drain.
2) Gallon jug 30 of antifreeze solution 35 is connected to water system 11 as shown in FIG. 2 by attaching flexible hose 31 and opening valve 27.
3) Pump 13 is activated to draw antifreeze solution 35 through hose 31 whereby antifreeze solution 35 is forced through water line 32 to commode 15.
4) Opening bypass line 22, as earlier described by manipulation of valves 23, 24 and 25 allows antifreeze solution 35 to pass through bypass line 22 to lavatory 16 and antifreeze solution 35 is also directed through water line 33 to drinking fountain 17.
5) Opening faucet 34 or by opening valve 36 on drinking fountain 17, antifreeze solution 35 flows through valve 34 or valve 36 whereby its odor can be easily, quickly detected by smelling, by electronic, chemical or mechanical odor detection or otherwise.

Once detected, the RV owner is assured that the water lines are properly winterized and will not freeze as the temperature drops during winter months.

As would be understood by those skilled in the art the preferred method of use as described above can be modified, depending on the exact water system utilized. For example, antifreeze solution 35 may be poured into a potable water system and gravity fed through available water lines. Also, the exact formulation of the antifreeze solution can be varied and other chemical compounds, other than methyl salicylate may also be used provided such compounds meet the safety, solubility, costs and other practical requirements. Also, a standard colorant may be added to the antifreeze solution if desired.

The illustrations and examples provided herein are for explanatory purposes and are not intended to limit the scope of the appended claims.

I claim:

1. A method of providing freezing protection to a potable water system comprising the steps of:

(a) draining the potable water system;
    (b) selecting an antifreeze solution comprising: ethyl alcohol and methyl salicylate; and
    (c) adding the selected antifreeze solution to the potable water system.

2. The method of claim 1 wherein the antifreeze solution further comprises propylene glycol.

3. The method of claim 1 wherein selecting the antifreeze solution comprises selecting an antifreeze solution comprising by volume:

15% ethyl alcohol/methyl salicylate;
    14% propylene glycol; and
    71% water.

4. The method of claim 3 wherein the step of selecting an antifreeze solution comprises selecting an antifreeze solution comprising an ethyl alcohol/methyl salicylate solution which contains by weight:

91% ethyl alcohol;
    1.5% methyl salicylate; and
    7.5% water.

5. The method of claim 1 wherein draining the potable water system comprises draining the potable water system of a recreational vehicle.

* * * * *